US012696315B2

(12) United States Patent　　(10) Patent No.: US 12,696,315 B2

Khoryaev et al.　　(45) Date of Patent: Jul. 28, 2026

(54) PHYSICAL CHANNEL AND RESOURCE DETERMINATION FOR COLLISION RESOLUTION INTER-UE COORDINATION SIGNALING IN NR V2X

(71) Applicant: Intel Corporation, Santa Clara, CA (US)

(72) Inventors: Alexey Khoryaev, Nizhny Novgorod (RU); Mikhail Shilov, Nizhny Novgorod (RU); Sergey Panteleev, Maynooth (IE); Kilian Peter Anton Roth, Munich (DE); Artyom Putilin, Kstovo (RU)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 18/570,819

(22) PCT Filed: Aug. 3, 2022

(86) PCT No.: PCT/US2022/039320

§ 371 (c)(1),
(2) Date: Dec. 15, 2023

(87) PCT Pub. No.: WO2023/014823

PCT Pub. Date: Feb. 9, 2023

(65) Prior Publication Data

US 2024/0284503 A1　Aug. 22, 2024

Related U.S. Application Data

(60) Provisional application No. 63/229,972, filed on Aug. 5, 2021.

(51) Int. Cl.
H04W 74/0808　(2024.01)
H04L 1/1867　(2023.01)

(52) U.S. Cl.
CPC ......... H04W 74/0808 (2013.01); H04L 1/189 (2013.01)

(58) Field of Classification Search
CPC . H04W 74/0808; H04W 76/23; H04W 72/25; H04W 24/08; H04W 72/563;
(Continued)

(56) References Cited

U.S. PATENT DOCUMENTS

2020/0328861 A1 * 10/2020　Malladi ................. H04L 5/0069
2021/0227602 A1　7/2021　Li et al.
(Continued)

FOREIGN PATENT DOCUMENTS

WO　WO-2019073358　A1 *　4/2019　........... H04L 5/0055
WO　WO-2022118301　A1 *　6/2022　........... H04W 72/20
WO　WO-2023014823　A1　2/2023

OTHER PUBLICATIONS

"Discussion on inter-UE coordination for Mode 2 enhancements", LG Electronics, R1-2105205, 3GPP TSG RAN WG1 Meeting #105-e, (May 12, 2021).
(Continued)

*Primary Examiner* — Marisol Figueroa

(74) *Attorney, Agent, or Firm* — Schwegman Lundberg & Woessner, P.A.

(57) ABSTRACT

An apparatus and system for new radio (NR) vehicle-to-everything (V2X) sidelink communications are described. Feedback channel design for inter-user equipment (UE) feedback includes a single or multi-bit conflict indication that indicates a type of collision between sidelink communications. Prioritization between Hybrid Automatic Repeat ReQuest (HARQ) feedback transmission/reception and the inter-UE coordination feedback transmission/reception are described. In addition, control of the number of times the inter-UE coordination feedback is transmitted is provided.

18 Claims, 7 Drawing Sheets

Out of control channel communication range

(58) Field of Classification Search
CPC ..... H04L 1/189; H04L 5/0055; H04L 5/0094;
H04L 1/1854; H04L 1/1887; H04L
5/0042; H04L 5/0053; H04L 1/0057;
H04L 1/1671; H04L 1/1812
See application file for complete search history.

(56) References Cited

U.S. PATENT DOCUMENTS

| | | | | |
|---|---|---|---|---|
| 2022/0030612 | A1* | 1/2022 | Balasubramanian | ........................ H04L 5/0053 |
| 2022/0046594 | A1* | 2/2022 | Lee | ........................ H04W 72/02 |
| 2022/0225160 | A1* | 7/2022 | Sarkis | ............... H04W 28/0284 |
| 2022/0360371 | A1* | 11/2022 | Ji | ........................ H04L 1/1819 |
| 2023/0247590 | A1* | 8/2023 | Wu | ................... H04W 74/0825 370/329 |

OTHER PUBLICATIONS

"International Application Serial No. PCT/US2022/039320, International Search Report mailed Nov. 15, 2022", 3 pgs.
"International Application Serial No. PCT/US2022/039320, Written Opinion mailed Nov. 15, 2022", 4 pgs.
"On Inter-UE Coordination", APPLE, R1-2105127, 3GPP TSG RAN WG1 Meeting #105-e, (May 12, 2021).
"Reliability and Latency Enhancements for Mode 2", Qualcomm Incorporated, R1-2104694, 3GPP TSG RAN WG1 Meeting #105-e, (May 12, 2021).
Intel Corporation, "Inter-UE coordination solutions for sidelink resource allocation mode-2", R1-2103049, 3GPP TSG RAN WG1 #104b-e, (Apr. 7, 2021), 12 pgs.

* cited by examiner

1 bit

| m = 0 | 0 | 1 | 2 | 3 | 4 | 5 | 6 | 7 | 8 | 9 | 10 | 11 |
|---|---|---|---|---|---|---|---|---|---|---|---|---|
| m = 6 | 6 | 7 | 8 | 9 | 10 | 11 | 0 | 1 | 2 | 3 | 4 | 5 |

Length-12 sequence

2 bits

| m = 0 | 0 | 1 | 2 | 3 | 4 | 5 | 6 | 7 | 8 | 9 | 10 | 11 |
|---|---|---|---|---|---|---|---|---|---|---|---|---|
| m = 4 | 8 | 9 | 10 | 11 | 0 | 1 | 2 | 3 | 4 | 5 | 6 | 7 |
| m = 8 | 4 | 5 | 6 | 7 | 8 | 9 | 10 | 11 | 0 | 1 | 2 | 3 |

Length-12 sequence

FIG. 5

PHYSICAL CHANNEL AND RESOURCE DETERMINATION FOR COLLISION RESOLUTION INTER-UE COORDINATION SIGNALING IN NR V2X

PRIORITY CLAIM

This application is a U.S. National Stage Filing under 35 U.S.C. 371 from International Application No. PCT/US2022/039320, filed Aug. 3, 2022 and published in English as WO 2023/014823 on Feb. 9, 2023, which claims the benefit of priority to U.S. Provisional Patent Application Ser. No. 63/229,972, filed Aug. 5, 2021, each of which is incorporated herein by reference in its entirety.

TECHNICAL FIELD

Embodiments pertain to next generation (NG) wireless communications. In particular, some embodiments relate to new radio (NR) sidelink communications, including NR vehicle-to-everything (V2X) sidelink communications.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities and vehicle communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 5 illustrates different frequency shifts for a 12-RE base sequence carrying a Scheme 2 conflict indication in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
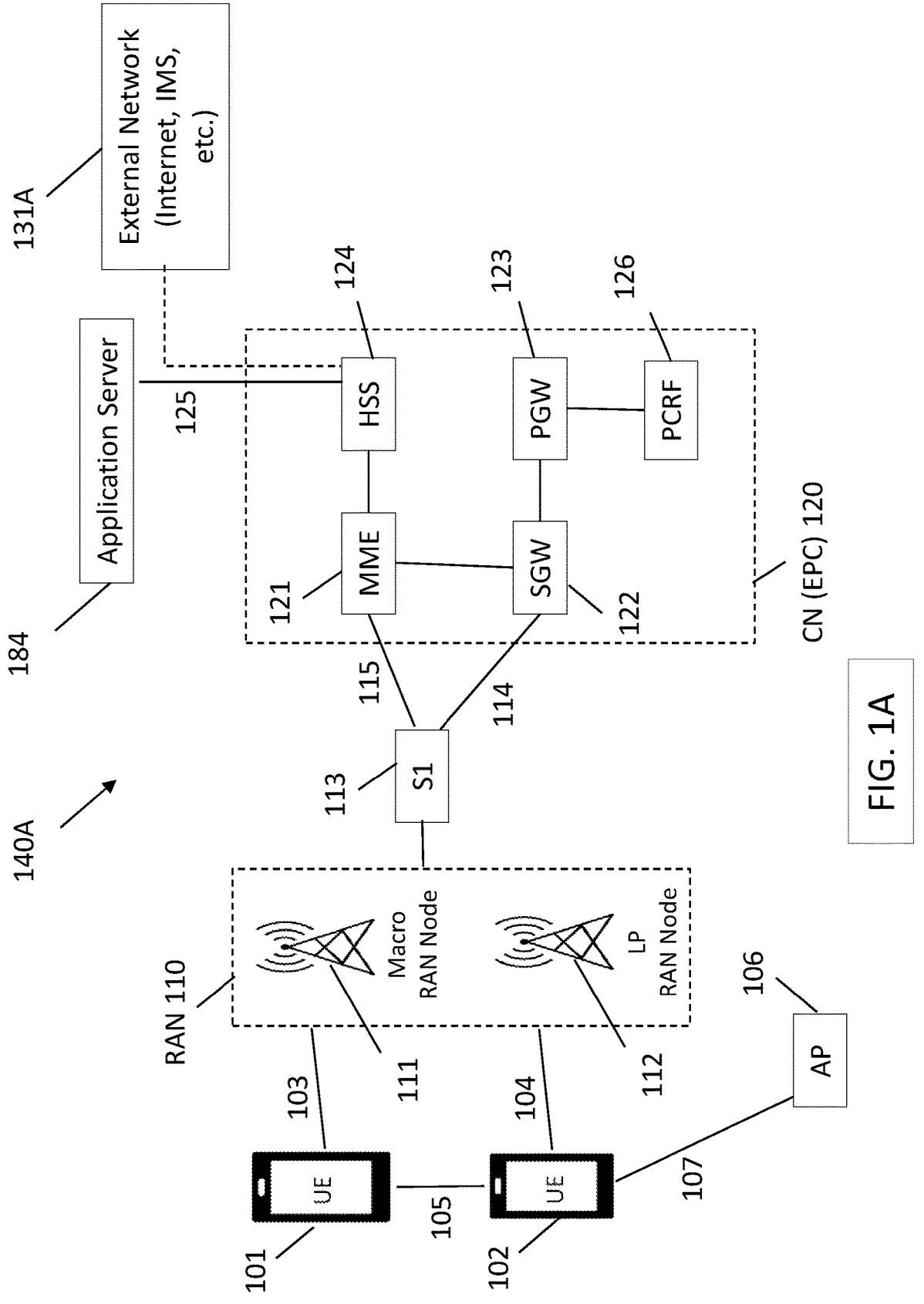
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHZ, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIOT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6$^{th}$ generation NodeBs— and thus may be alternately referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW)

122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces.

More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
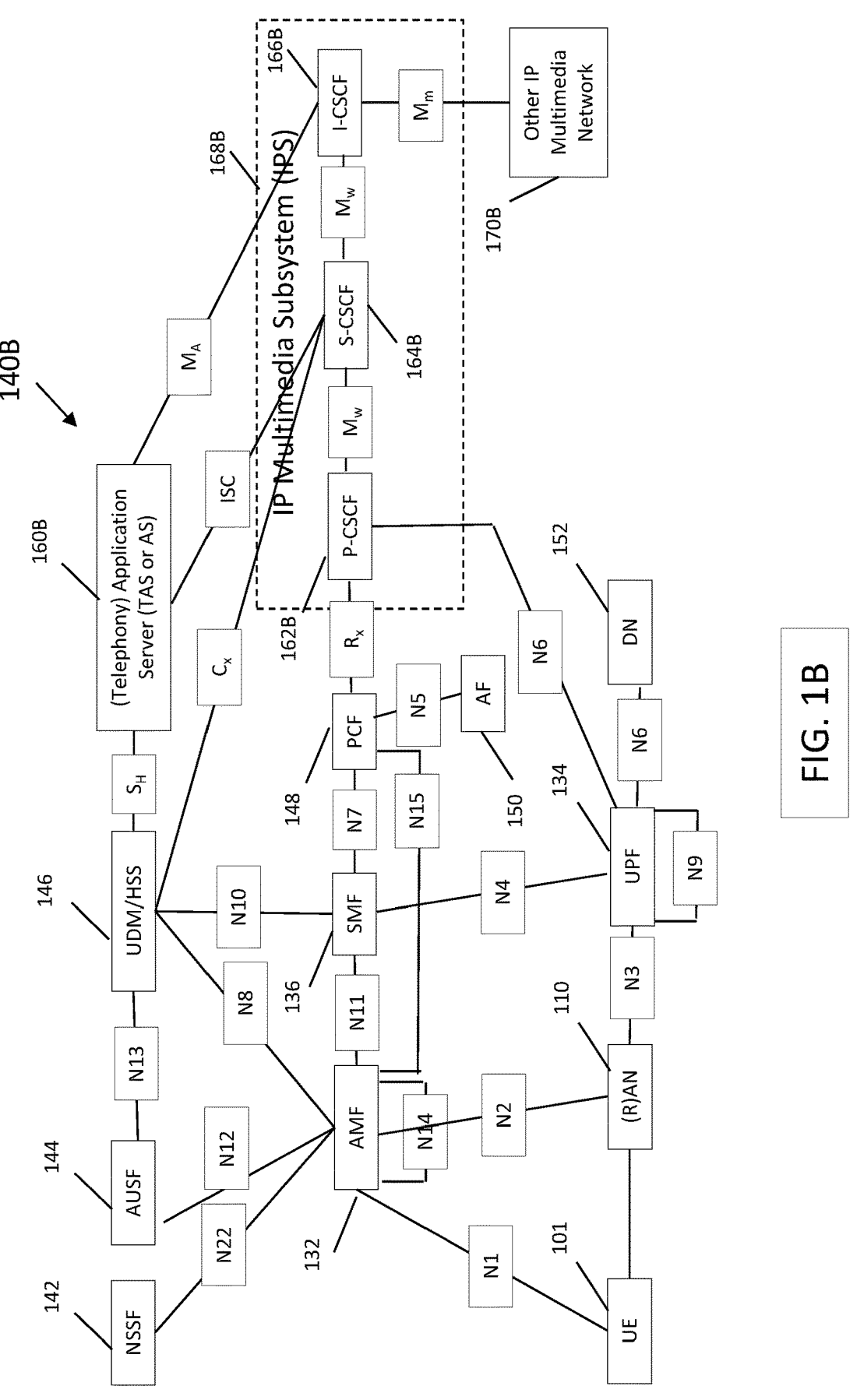
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs).

More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
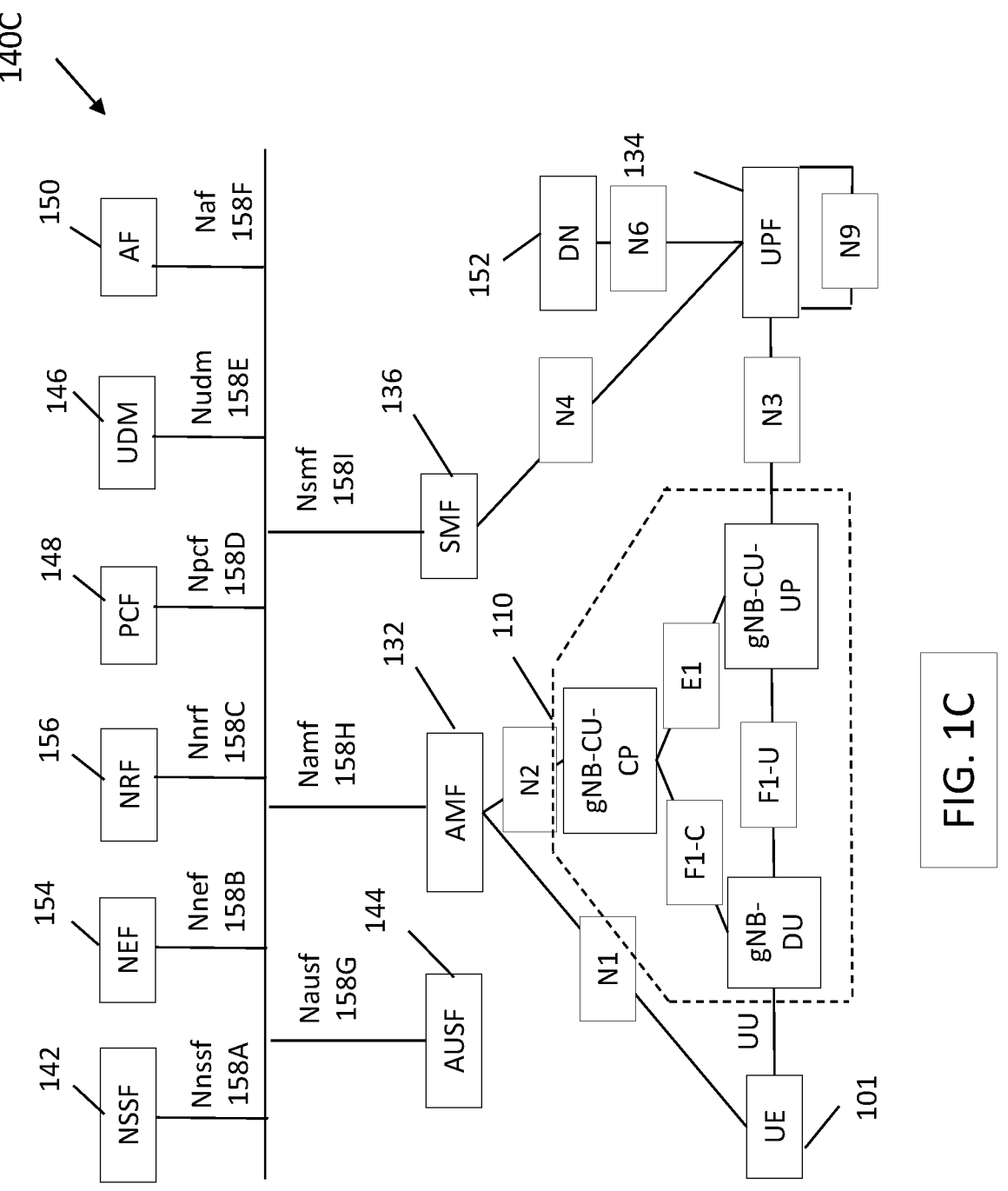
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
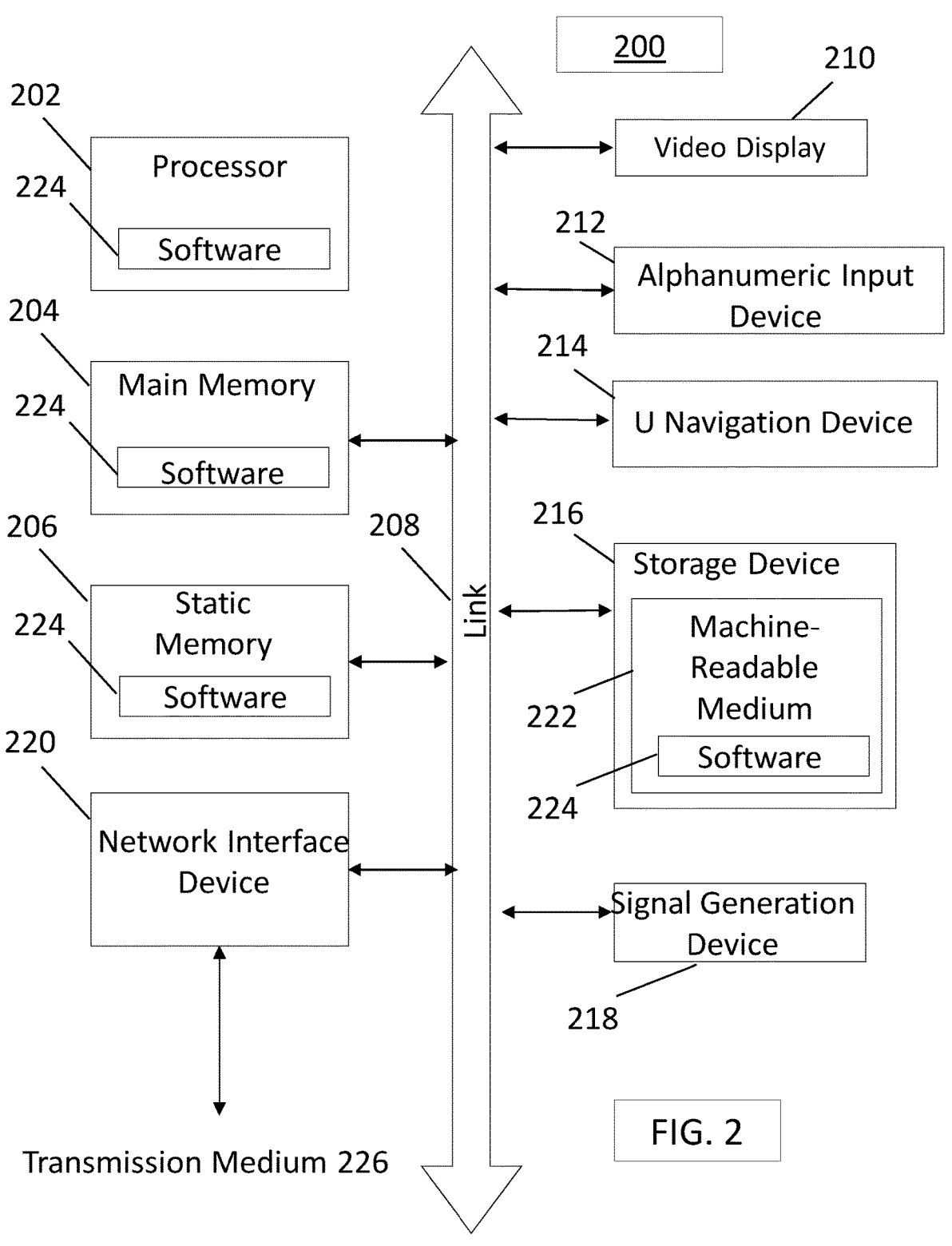
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925

MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHZ, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHZ, 31-31.3 GHZ, 37-38.6 GHZ, 38.6-40 GHz, 42-42.5 GHZ, 57-64 GHZ, 71-76 GHZ, 81-86 GHz and 92-94 GHz, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, NR V2X sidelink communication is a synchronous communication system with distributed resource allocation. UEs autonomously select resources for sidelink transmission based on predefined sensing and resource selection procedures implemented by transmitter (TX) UEs. The sensing and resource selection procedures are designed to reduce potential sidelink conflicts in transmissions or resource reservations (e.g., collisions or half-duplex conflicts). Given that sensing and resource selection procedures are executed only by TX UEs and do not consider environment at the receiver (RX) side there is non-negligible probability of sidelink conflicts (collisions). To address this problem, inter-UE coordination feedback from RX UEs can be used to improve resource allocation decisions by TX UEs and improve overall reliability of NR-V2X sidelink communication.

High reliability and low latency of sidelink V2X communication are key performance indicators (KPIs) used for NR V2X systems. In NR Rel.17, the study phase on inter-UE coordination for sidelink V2X reliability enhancements in RANI working group (WG) concluded that inter-UE coordination methods are beneficial for sidelink reliability enhancements. Accordingly, specific inter-UE coordination operations are described that can provide low latency and high reliability for the future generation of NR V2X systems.

Baseline NR V2X system operations developed in Rel.16 include: UEs transmitting sidelink data (communicating in either unicast or groupcast or broadcast mode) use a control channel to reserve sidelink resources for future retransmissions of the transmission block (TB); UEs monitor the sidelink control channel in each slot and perform a sensing procedure by decoding control channel transmissions from other UEs and measuring the sidelink Reference Signal Received Power (SL-RSRP) of the control channel transmissions; sidelink resources selected for transmission are determined based on results of sensing and resource (re)-selection procedure aiming to avoid collision among UEs; and UEs use the sidelink feedback channel introduced for Hybrid Automatic Repeat ReQuest (HARQ) operation for unicast and groupcast communication.

The procedures of UE-autonomous sensing and resource (re)-selection defined in Rel.16 provide performance benefits over random resource (re)-selection. Operations to further improve reliability of NR V2X sidelink communication by means of low latency inter-UE coordination feedback signaling are described herein.

Inter-UE coordination signaling can help to increase reliability by reducing the negative performance impact due to half-duplex and co-channel collision events in Rel. 16 NR-V2X communication systems. In this document, we intentionally distinguish between sidelink conflicts such as half-duplex and co-channel collisions and use the following definitions.

Half-Duplex and Co-Channel Collision Sidelink Conflicts:

Half-Duplex $UE_P$ has a half-duplex event with $UE_Q$ if $UE_P$ is a target receiver (RX) of $UE_Q$ (e.g., $UE_P$ is a member of the $UE_Q$ group) and may not be able to receive transmissions from $UE_Q$ due to its own transmission. The following half-duplex conflicts can be distinguished:

Half-duplex in transmission (HD-TX): $UE_P$ and $UE_Q$ have already transmitted in the same sidelink slot (on overlapped or non-overlapped resources in frequency). This type of collision can be addressed by introducing new inter-UE coordination signaling.

Half-duplex in reception (HD-RX): $UE_p$ reserved a resource for transmission to $UE_Q$ in slot 'n'. $UE_Q$ is scheduled for a more prioritized UL or SL transmission and thus cannot receive a transmission from $UE_P$ on the reserved resource in slot 'n'. This type of conflict can be partially addressed by introducing new inter-UE coordination signaling if this signaling can be received before transmission on the reserved resource.

Half-duplex in resource selection (HD-SLCT): $UE_P$ and $UE_Q$ have selected a resource for transmission in the same slot (on overlapped or non-overlapped resources in frequency). This type of conflict can be partially addressed by (re)-evaluation procedure defined in Rel.16 if reservation for selected resources has not been done yet by one of UEs and there is enough processing delay to reselect the resource.

Half-duplex in resource reservation (HD-RSV): $UE_P$ and $UE_Q$ have reserved a resource for transmission in the same slot (on overlapped or non-overlapped resources in frequency). This type of conflict can be addressed by introducing new inter-UE coordination signaling.

Half-duplex may significantly degrade performance of sidelink reception for other RX UEs as, if the $UE_P$ and $UE_Q$ transmitted on overlapping frequency resources (co-channel collision), neither transmission will be decodable.

Co-Channel Collision $UE_P$ has a co-channel collision with $UE_Q$ if $UE_P$ and $UE_Q$ transmit on overlapping frequency or time resources. The following co-channel collision types can be distinguished:

Co-channel collision in transmission (CC-TX): In this case, the TX UEs ($UE_P$ and $UE_Q$) have already transmitted in the same sidelink slot on overlapping frequency resources (full or partial overlap).

Co-Channel Collision in Resource Selection (CC-RS):

In this case, the TX UEs ($UE_P$ and $UE_Q$) have selected a resource for transmission in the same slot on overlapping frequency resources (full or partial overlap). This event may not be detectable unless one of TX UEs already made a resource reservation.

Co-Channel Collision in Resource Reservation (CC-RSV):

In this case, the TX UEs ($UE_P$ and $UE_Q$) have reserved resources for transmission in the same slot on overlapping frequency resources (full or partial overlap).

The sidelink conflicts described above are considered from single TX UE perspective. The half-duplex and co-channel collisions may happen on resources used for either initial transmission of a TB or retransmission or various combinations from TX UE perspective: Combination-A: Resources used for initial transmission of a TB by $UE_P$ and $UE_Q$; Combination-B: Resources used for retransmissions of a TB by $UE_P$ and $UE_Q$; Combination-C: Resource used for initial transmission of a TB by $UE_P$ and resource carrying retransmission of a TB by $UE_Q$.

Figure 3:
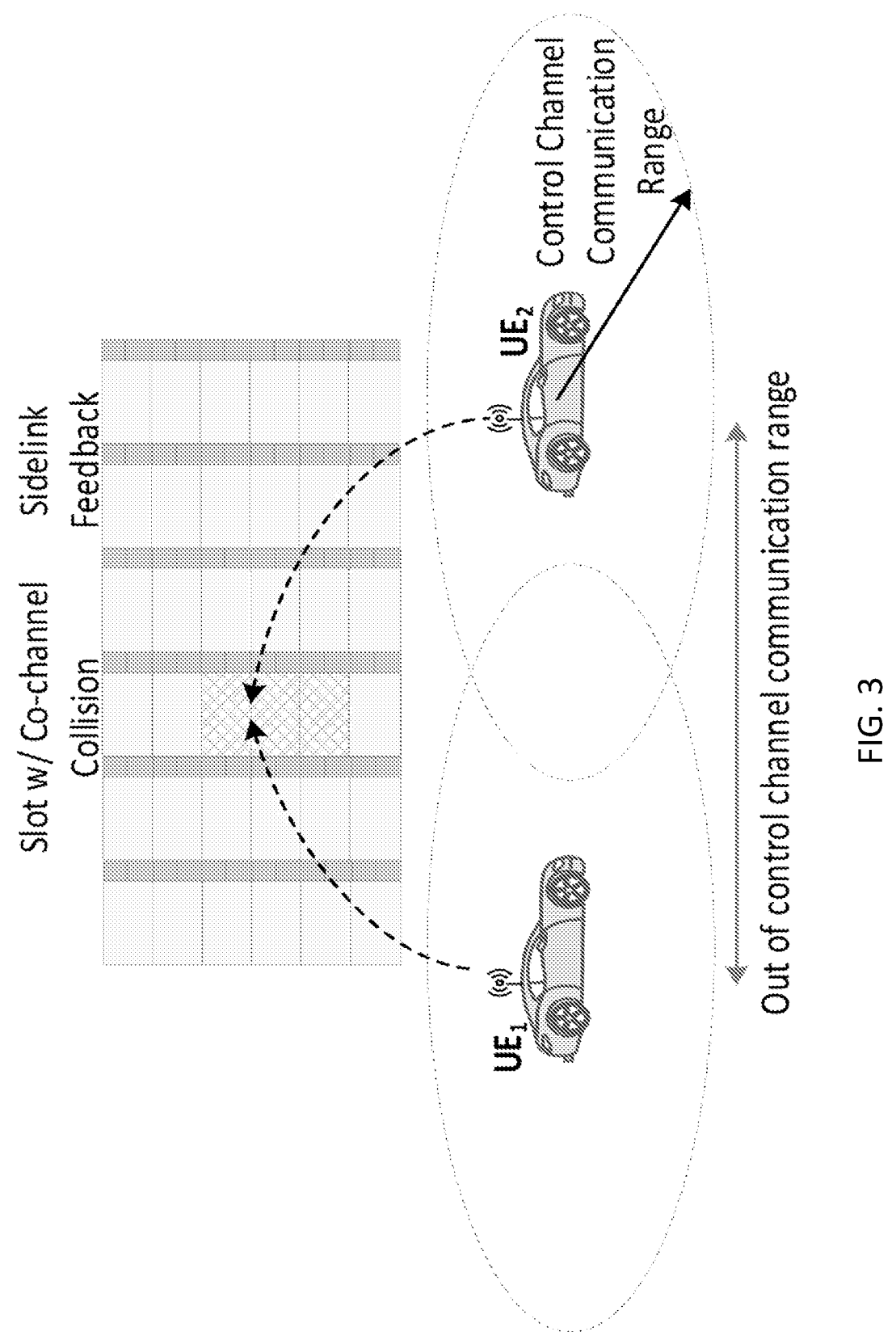
FIG. 3 illustrates a hidden node collision in accordance with some embodiments.

The following co-channel collision types exist in the Rel. 16 V2X design: Type-1 (Hidden Node): Cochannel collisions due to hidden node problem. Transmitting UE(s) are out of communication range from each other (i.e., cannot sense each other) but within communication range of a RX UE. FIG. 3 illustrates a hidden node collision in accordance with some embodiments.

Figure 4:
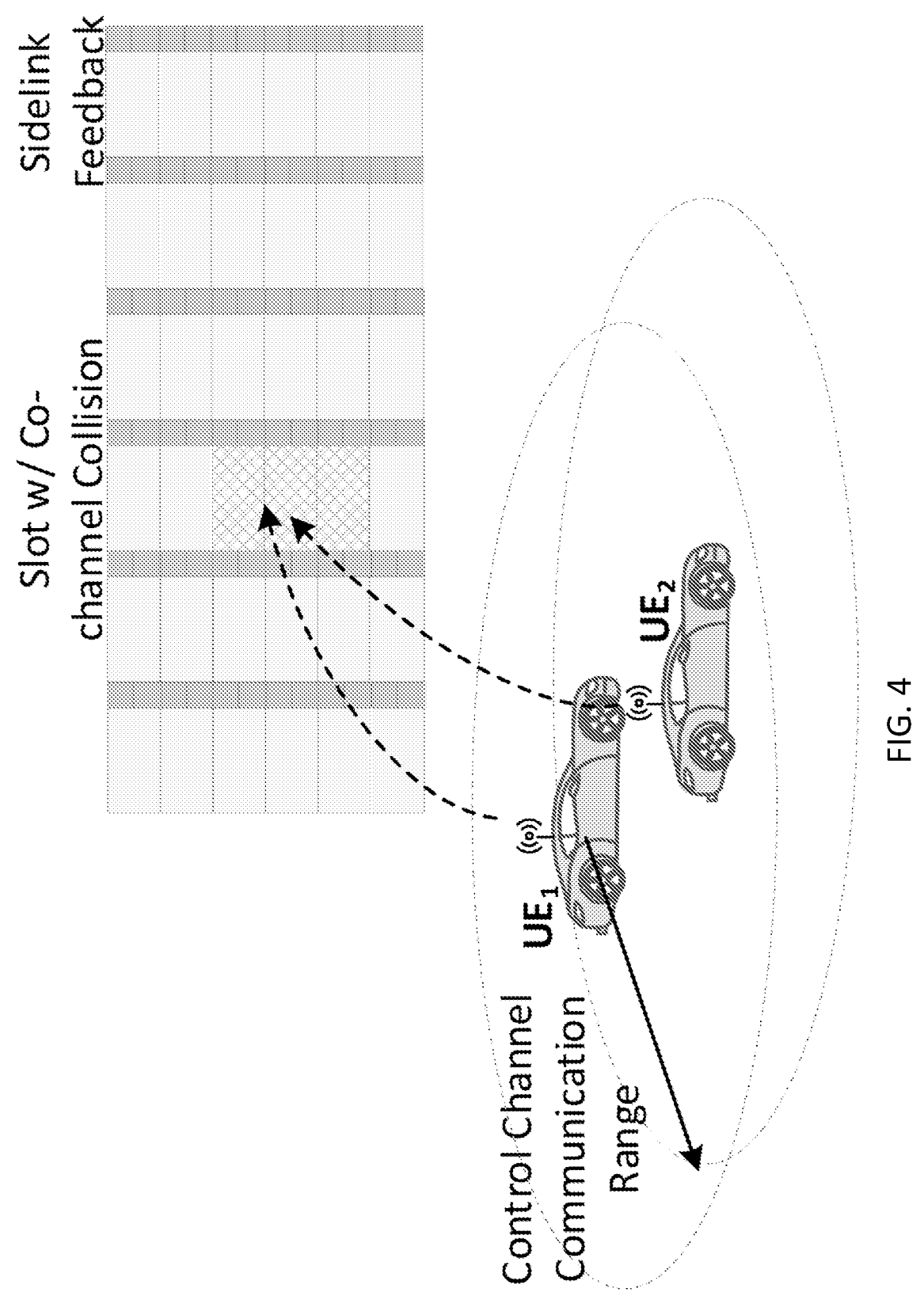
FIG. 4 illustrates a simultaneous access collision in accordance with some embodiments.

Type-2 (Simultaneous Access): Co-channel collisions due to simultaneous resource (re)-selection caused by processing time delay or lack of sensing data due to sidelink transmissions, etc. Transmitting UEs are within communication range from each other (i.e., it is feasible to sense each other), however simultaneously perform resource (re)-selection and access the channel in the same slot on overlapping resources. FIG. 4 illustrates a simultaneous access collision in accordance with some embodiments.

Type-3. (Congested Medium) Co-channel collisions due to lack of unoccupied resources (high medium congestion). TX UEs are within communication range from each other (i.e., can sense each other), however access to the channel is congested (resources are occupied) and a UE selects an occupied resource within the set of resources with minimum RX power level. In this case, collisions are not avoidable thus congestion control mechanisms should be used to reduce the rate of collisions.

Inter-UE coordination feedback and signaling operations to mitigate the following conflicts of NR-V2X sidelink communication are disclosed herein: Half-duplex in transmission (HD-TX), Half-duplex in reservation (HD-RSV), Half-duplex in reception (HD-RX), Co-channel collision in transmission (CC-TX), and Co-channel collision in reservation (CC-RSV).

To address these conflicts by inter-UE coordination, low latency sidelink feedback signaling is introduced as part of Scheme 2 inter-UE coordination feedback, i.e., collision resolution feedback. The inter-UE coordination framework includes the following design components: Physical channel design for the inter-UE coordination feedback, Resource allocation for the inter-UE coordination feedback, Priority handling for the inter-UE coordination feedback, and Over-feedback issue handling.

Feedback Channel Design Details—Physical Sidelink Feedback Channel (PSFCH) Like Design for Inter-UE Coordination Feedback Inter-UE coordination feedback for Scheme 2 aims to indicate from UE-A to UE-B that conflict has been detected and UE-B may take actions to reduce/avoid the impact of the conflict on the quality of packet delivery of UE-B. As discussed previously, there are different types of conflict that may be determined: HD-RX, HD-TX, HD-RSV, CC-TX, CC-RSV. Depending on the type of the conflict, UE-B may perform different actions for reducing/avoiding the impact from the collision, thus the type of the conflict may be signaled from UE-A to UE-B for UE-B to determine the desired action.

Let the payload of the Scheme 2 conflict indication be Z bits, which may indicate up to $2^Z$ different collision types or combinations of collision types. In a simple scenario, the indication is one-bit or a presence indication, for one Scheme 2 conflict only. In an advanced scenario, the indication may convey multiple conflicts for multiple UE-Bs.

Different design options exist for Scheme 2 conflict indication design in terms of physical layer depending on the number of payload bits.

Scheme 2 Indication Payload Z=1-2 Bit

For this type of indication, a short PUCCH format 0 or PSFCH format physical structure may be taken as a baseline. However, additional considerations may be used to incorporate specifics of the Scheme 2 conflict indication.

For a 1-bit indication, the PSFCH physical structure with 1 PRB frequency domain allocation and 2 symbols time domain allocation may be fully reused so that the physical channel may co-exist with sidelink Hybrid Automatic Repeat ReQuest acknowledgment (SL HARQ-ACK) feedback transmissions in the same resources.

For a 2-bit indication, the PSFCH physical structure with 1 PRB frequency domain allocation and 2 symbols of time domain allocation may also be reused. In this case, the two bits of information may be encoded using different frequency shifts of the sequence mapped to 12 resource elements, as illustrated in Table 1. Here m denotes the frequency shift, $m\_0$ denotes the basic shift, and $m\_offset$ denotes the difference between two different states of the indication, which may typically be equal to 6, or any other value from 1 to 11.

TABLE 1

| Example mapping of Scheme 2 conflict indication frequency shifts to payload | |
| --- | --- |
| Payload | Frequency shift m |
| No conflict | No presence of the indication |
| Conflict 1 | m = m_0 |
| Conflict 2 | m = modulo(m_0 + m_offset, 12) |

In Table 2, another example that can indicate conflict 1, conflict 2, or both conflicts is shown. Here, $m\_offset\_0$ and $m\_offset\_1$ are used to create two different frequency shifts relative to $m\_0$. Typical values could be 4 and 8 for the best separation.

TABLE 2

| Example mapping of Scheme 2 conflict indication frequency shifts to payload | |
| --- | --- |
| Payload | Frequency shift m |
| No conflict | No presence of the indication |
| Conflict 1 | m = m_0 |
| Conflict 2 | m = modulo(m_0 + m_offset_0, 12) |
| Conflict 1 and 2 | m = modulo(m_0 + m_offset_1, 12) |

FIG. 5 illustrates different frequency shifts for a 12-RE base sequence carrying a Scheme 2 conflict indication in accordance with some embodiments. In FIG. 5, the mechanism of frequency shift for encoding different conflicts for 1-bit and 2-bit cases are illustrated, with m_offset=6 used for 1-bit case and m_offset=4 used for 2-bit case.

Alternatively, for 2-bit indication, the frequency domain allocation size may be 2 physical resource blocks (PRB) or another value of L PRB.

In one example, the slots where Scheme 2 conflict indication may be transmitted are configured as a full set or as a subset of the slots for PSFCH for SL HARQ-ACK in a given sidelink resource pool. The periodicity of Scheme 2 conflict indication resources may be configurable by a value 'C', which may take values at least from the {1,2,4} set, and may additionally take other values e.g., {6, 8, 10, 12, 14, 16} etc. The UE may not be expected to be configured with PSFCH periodicity N and Scheme 2 conflict indication periodicity C so that N is larger than C or more generally slots indicated with periodicity C are not sub-set of slots indicated by periodicity N, in order to preserve backward compatibility with devices not capable of monitoring the Scheme 2 conflict indication. Alternatively, the values N and C may not have a coupled and direct relation.

In one example, the frequency resources for a Scheme 2 conflict indication may be (pre-)configured as a PRB pattern separately from the resources of the PSFCH channel. Alternatively, the same PRB pattern as for the PSFCH may be used for Scheme 2 conflict indication, especially when a 1-bit payload is used.

In one example, the starting symbol in a slot for a Scheme 2 conflict indication may be determined as L_end+1 where L_end is the last symbols of the physical sidelink shared channel (PSSCH) in a given slot. Effectively, this means the Scheme 2 conflict indication follows immediately after possible a PSSCH allocation with an additional 1-symbol time gap for RX-TX/TX-RX switching purposes. Alternatively, the starting symbol in a slot for the Scheme 2 conflict indication may be configured per resource pool from the range 0 . . . 13.

In one example, the number of symbols for the Scheme 2 conflict indication may be fixed to two. In this case, the second symbol of the two symbols is the repetition of the first symbol, with possible sequence hopping.

In order to differentiate a Scheme 2 conflict indication from the PSFCH, in one example, the base sequence for the Scheme 2 conflict indicated may be separately (pre-)configured per resource pool from a PSFCH-based sequence. In another example, a (pre-)configured or predetermined cyclic shift may be introduced for Scheme 2 conflict indication.

Scheme 2 Indication Payload Z>2 Bit

If the number of bits for indication is greater than 2, a sequence-based physical channel design may not be suitable due to the performance and complexity of the detection of such a signal. As it is also applied in 5G NR uplink physical control channel (PUCCH) design, for such payloads, a different physical structure that uses channel coding scheme may be utilized.

In one example, a Z bit payload for the Scheme 2 conflict indication may be carried on a physical channel that reuses the structure of PUCCH format 2. In particular, the payload Z may be encoded using a Reed-Muller coding scheme or a Polar Coding scheme for ≤11 bit and for >11 bit respectively. The frequency domain allocation size L PRB may be predetermined or may be (pre-)configurable per resource pool, with L ranging from 1 PRB. The time domain allocation may be two symbols, in which case the second symbol is a copy of the first symbol, while the rate-matching procedure is only performed assuming one symbol.

The starting PRB of such an indication may be determined following similar equations/rules as for a 1-PRB PSFCH transmission or a Scheme 2 conflict indication. In particular, the starting PRB may be a function of: starting sub-channel of the PSCCH of the UE-B transmission that was detected to cause the collision, k_start, the number of PRBs of the PSSCH allocation of the UE-B transmission that was detected to cause the collision, L_PSSCH, the source layer 1 (L1) identity, the destination L1 identity, and/or a specific sidelink control information (SCI) format 1 or SCI format 2 payload dedicated to resource determination of the Scheme 2 conflict indication.

The payload of the indication may be represented by Table 3, in which the different conflicts for potentially different UE-B may be listed:

TABLE 3

| Example mapping of Scheme 2 conflict indication into payload | | |
|---|---|---|
| UE | Conflict combination | Payload |
| UE-B 0 | Conflict combination 1 | 0 or 1 |
| UE-B 0 | Conflict combination 2 | 0 or 1 |
| UE-B 1 | Conflict combination 1 | 0 or 1 |
| UE-N 1 | Conflict combination 2 | 0 or 1 |
| . . . | . . . | |

In another example, every bit of the indication may be carried separately by a 1-PRB PSFCH channel. As a result, if no conflict has been detected, then no transmission happens, if one type of conflict was detected then the UE transmits a 1 PRB PSFCH channel in the corresponding resource, and if two conflicts were detected then the UE transmits two 1 PRB PSFCH channels in the corresponding resources. The different conflicts in this case are differentiated by different PRB/frequency resource offsets.

The set of PRBs assuming the single Scheme 2 conflict indication resource size is L may be determined using the following modified procedure similar to the one defined in TS 38.213, section 16.3:

A UE is provided by scheme2-Conflict-Indication-PRB-set a set of $$M_{PRB,set}^{scheme2set}$$

PRBs in a resource pool for Scheme 2 conflict indication transmission in L PRBs of the resource pool. For a number of $N_{subch}$ sub-channels for the resource pool, provided by sl-NumSubchannel, and a number of PSSCH slots associated with a Scheme 2 conflict indication slot that is less than or equal to $$N_{PSSCH}^{scheme2set},$$

the UE allocates the $$\left[\left(i + j \cdot N_{PSSCH}^{scheme2set}\right) \cdot M_{subch,slot}^{scheme2set}, \left(i + 1 + j \cdot N_{PSSCH}^{scheme2set}\right) \cdot \right.$$

$$\left. M_{subch,slot}^{scheme2set} - 1\right]$$

groups of L PRBs from the $$M_{PRB,set}^{scheme2set}$$

PRBs to slot i among the PSSCH slots associated with the Scheme 2 conflict indication slot and sub-channel j, where $$M_{PRB,set}^{scheme2set} / \left( N_{subch} \cdot N_{PSSCH}^{scheme2set} \cdot L \right), 0 \leq i < N_{PSSCH}^{scheme2set}, 0 \leq j < N_{subch},$$

and the allocation starts in an ascending order of i and continues in an ascending order of j. The UE expects that $$M_{PRB,set}^{scheme2set}$$

is a multiple of $$N_{subch}$$

.

$$N_{PSSCH}^{scheme2set}$$

·L.

Priority of Inter-UE Coordination Feedback Transmission

For inter-UE coordination Scheme 2 (sidelink conflict resolution), an assisting UE-A may transmit inter-UE coordination feedback as well as transmit or receive HARQ feedback at the same time. Two events such as transmission/reception of inter-UE coordination feedback and transmission/reception of HARQ feedback may occur in the same slot, resulting in the UE deciding which action to take: transmit inter-UE coordination feedback or receive HARQ feedback; transmit inter-UE coordination feedback or transmit HARQ feedback; if the UE is not capable of simultaneous transmissions of these two channels, in some circumstances, receive inter-UE coordination feedback or transmit HARQ feedback; or transmit inter-UE coordination feedback or receive inter-UE coordination feedback.

In general, inter-UE coordination feedback reception can always be lower priority than transmission of HARQ feedback or inter-UE coordination feedback since the presence for processing is not known in advance (compared to HARQ feedback), thus there is no explicit/inherited priority. To resolve such conflicts the following options can be used:

Option 1: HARQ feedback transmission/reception is prioritized over inter-UE coordination feedback transmission/reception. In one example, prioritization may be (pre-)configured—i.e., whether a UE prioritizes HARQ feedback transmission/reception over the inter-UE coordination feedback transmission. In one example, if a UE is capable of simultaneous transmission of multiple PSFCH and inter-UE coordination feedback transmissions, defined by a total number M, the UE may first identify M_PSFCH≤M transmissions of the PSFCH subject to power control, and then spend (M−M_PSFCH) resources for the inter-UE coordination feedback, subject to power control restrictions.

Option 2: Inter-UE coordination feedback transmission/reception is prioritized over HARQ feedback transmission/reception. In one example, prioritization may be (pre-)configured—i.e., whether a UE prioritizes inter-UE coordination feedback transmission over HARQ feedback transmission/reception. In one example, if a UE is capable of simultaneous transmission of multiple PSFCH and inter-UE coordination feedback transmissions, defined by total number M, the UE may first identify (M_inter-UE_coord)≤M transmissions of the inter-UE coordination feedback subject to power control, and then spends (M−M_inter-UE_coord) resources for the PSFCH transmissions, subject to power control restrictions.

Option 3: Inter-UE coordination feedback is associated with sidelink transmission priority and the priority is used to decide which procedures to prioritize. The sidelink transmission priority levels of inter-UE coordination and HARQ feedback are used to determine whether transmission/reception of inter-UE coordination feedback is prioritized over reception/transmission of HARQ feedback. A UE may be expected to transmit the inter-UE coordination feedback with a priority value p_i only when there is no other PSFCH with higher priority left unselected for transmission; that is, assuming a priority value p_PSFCH of a PSFCH, there is no unselected PSFCH with priority value p_i>p_PSFCH. A UE may be expected to transmit an inter-UE coordination feedback with a priority value p_i only when there is no other inter-UE coordination feedback with higher priority left unselected for transmission; that is, assuming priority value p_j of a higher priority inter-UE coordination feedback, there is no unselected inter-UE coordination feedback with priority value p_i>p_j.

Over-Feedback—Control of Amount of Feedback Transmissions

When a Scheme 2 conflict indication is enabled, a receiver UE (UE-A) may be expected to generate and transmit a Scheme 2 conflict indication in response to a trigger or request. In some cases, such an indication may not be helpful in the system due to several reasons: the indication may create additional loading in the system, so that the tradeoff between collision indication gains and increased collision/interference in the feedback channel degrades the overall system performance; or the UE-B that is targeted by the Scheme 2 conflict indication may not know that the packet was already successfully received even though the conflict indication was detected. This can create redundant retransmissions that are not helping to deliver the already-delivered message.

To alleviate the potential over-feedback issue, additional procedures may be introduced. There are two different procedures involved: a UE-A procedure to decide whether to report the Scheme 2 conflict indication to the UE-B(s); and/or a UE-B procedure to decide whether to act upon receiving a Scheme 2 conflict indication from UE-A(s)

UE-A (Scheme 2 Conflict Indication Sending UEs) Procedures

In one example, a UE that detects a collision that is subject to a Scheme 2 conflict indication (e.g., a half-duplex collision in transmission of a UE-B), may apply a specific condition deciding whether or not to transmit the Scheme 2 conflict indication to the UE-B. The condition may be specified or may be up to UE implementation. Example conditions to be considered may include:

UE-A may not transmit or may reduce transmission priority of a Scheme 2 conflict indication when a conflict is detected on a UE-B N-th re-transmission, i.e., not an initial UE-B transmission of a transport block. This is explained by the increasing probability of packet delivery with each retransmission. Here N may be pre-determined, e.g., N=1, or may be (pre-) configured. The retransmission counting may either be left up to UE-A implementation, or may be based on an explicit indication in SCI format 1 or 2. For example, the SCI format may convey a retransmission index, or a flag indicating that the Scheme 2 conflict indication is allowed in response to this transmission.

UE-A may apply congestion control to a Scheme 2 conflict indication and transmit the Scheme 2 conflict indication only when a congestion metric exceeds a congestion threshold; otherwise, UE-A may avoid transmission of the Scheme 2 conflict indication. The congestion metric may be Channel Busy Ratio (CBR), Channel Occupancy Ratio (CR), SL-RSRP, RSRQ, etc.

UE-A may not transmit a Scheme 2 conflict indication when a conflict is detected for a UE-B transmission of a transport block for which the UE-A has previously transmitted the Scheme 2 indication. The number of transmissions of the Scheme 2 conflict indication for a given UE-B for a given conflict type the UE-A can perform may be configurable.

UE-B (Scheme 2 Conflict Indication Receiving UEs) Procedures

In one example, a UE that detects a Scheme 2 conflict indication from another UE-A(s) may apply a specific condition deciding whether or not to take the Scheme 2 conflict indication into account (e.g., generate a retransmission). The conditions may be specified or may be left up to UE implementation. Various example conditions may be considered, including:

UE-B may not take into account a received Scheme 2 conflict indication if UE-B determines by other means that the transport block/packet has been successfully delivered to intended receivers. For example, if explicit ACKs were received from all intended receivers.

UE-B may not take into account a received Scheme 2 conflict indication if the next transmission is to occur T seconds from the moment of the indication processing, and T is smaller than the time to make changes to the transmission/reservation schedule.

UE-B may not take into account a received Scheme 2 conflict indication for resources planned to be used for K, K+1, etc. retransmissions, where K may be pre-defined (e.g., K=1 or 2) or may be (pre-)configured. The motivation is to ignore the conflict indications for retransmissions since the probability of successful delivery of the packet increases with each retransmission. As a variant of this option, a maximum number of (re-) transmissions may be configured separately for the case when the Scheme 2 conflict indication is activated and/or detected by a UE-B.

UE-B may not take into account a received Scheme 2 conflict indication from a UE when the Scheme 2 conflict indication meets some criteria, e.g., RSRP measurement, DST/SRC ID, range. For example, if the conflict indication is received from a UE beyond a pre-configured range R, the Scheme 2 conflict indication is not taken into account.

UE-B may be allowed by implementation to ignore Scheme 2 conflict indication.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a first user equipment (UE), the apparatus comprising:

processing circuitry to configure the first UE to:

receive a first sidelink message from a second UE;

transmit, to the other second UE, a second sidelink message;

in response to transmission of the second sidelink message, receive, from the second UE, inter-UE coordination feedback containing a conflict indication that indicates a collision of the second sidelink message or with a future sidelink message from the first UE, the collision indicating simultaneous access of a channel using overlapping resources, the conflict indication being at least 1 bit, the conflict indication having a physical sidelink feedback channel (PSFCH) physical structure with a 1 physical resource block (PRB) frequency domain allocation and a 2 symbol time domain allocation, the PSFCH physical structure reused for both transmision of the conflict indication and transmission of sidelink Hybrid Automatic Repeat Request Acknowledgment (SL HARQ-ACK) feedback; and in response to reception of the conflict indication, take action to resolve the collision; and a memory configured to store the inter-UE coordination feedback.

2. The apparatus of claim 1, wherein:

the conflict indication is 1 bit, and the conflict indication and the SL HARQ-ACK feedback co-exist in a same resource pool using the PSFCH physical structure.

3. The apparatus of claim 1, wherein:

the conflict indication is 2 bits encoded using different frequency shifts of a sequence mapped to 12 resource elements, and the conflict indication and the SL HARQ-ACK feedback co-exist in a same resource pool using the PSFCH physical structure.

4. The apparatus of claim 1, wherein:

the conflict indication is 2 bits, and the conflict indication has a frequency domain allocation size of at least 2 physical resource blocks (PRB).

5. The apparatus of claim 1, wherein slots for transmission of the conflict indication are configured as a full set or as a subset of slots for transmission of a PSFCH for the SL HARQ-ACK feedback in a sidelink resource pool.

6. The apparatus of claim 1, wherein frequency resources for transmission of the conflict indication are configured as a PRB pattern separate from resources of a PSFCH.

7. The apparatus of claim 1, wherein a starting symbol in a slot for the conflict indication is L_end+1 where L_end is a last symbol of a physical sidelink shared channel (PSSCH) in a slot.

8. The apparatus of claim 1, wherein the conflict indication is differentiated from a PSFCH using a base sequence for the conflict indication that is configured separately per resource pool from a PSFCH-based sequence.

9. The apparatus of claim 1, wherein the conflict indication is differentiated from a PSFCH using a cyclic shift for the conflict indication that is configured separately per resource pool from a PSFCH-based sequence.

10. The apparatus of claim 1, wherein the conflict indication is encoded using a Reed-Muller coding scheme for at most 11 bits and a Polar Coding scheme for greater than 11 bits.

11. The apparatus of claim 10, wherein a starting physical resource block (PRB) of the conflict indication is a function of at least one of:

a starting sub-channel of a physical sidelink control channel (PSCCH) of the second sidelink message, a number of physical resource blocks (PRB) of a PSSCH allocation of the second sidelink message, a source layer 1 (L1) identity, a destination L1 identity, or a sidelink control information (SCI) format 1 or SCI format 2 payload dedicated to resource determination of the conflict indication.

12. The apparatus of claim 1, wherein:

the conflict indication is at least two bits, and each bit of the conflict indication is carried separately by a different PRB PSFCH channel such that the first UE receives a 1 PRB PSFCH channel in a first resource in response to one type of conflict being detected, and the 1 PRB PSFCH channel in the first resource and in a second resource in response to two types of conflict being detected.

13. The apparatus of claim 1, wherein at least one of:

HARQ feedback transmission or reception is prioritized over transmission or reception of the inter-UE coordination feedback, the inter-UE coordination feedback is associated with sidelink transmission priority and the sidelink transmission priority is used to determine which of the inter-UE coordination feedback and HARQ feedback to prioritize, transmission priority of the conflict indication is reduced in response to conflict detection on a retransmission of the conflict indication that is later than a first retransmission of the conflict indication, transmission of the conflict indication is dependent on a congestion metric exceeding a congestion threshold, or transmission of the conflict indication is dependent on whether an earlier conflict indication of a same conflict indication has already been transmitted.

14. The apparatus of claim 1, wherein the processing circuitry further configures the first UE to ignore the conflict indication in response to at least one of:

determination of successful delivery of the second sidelink message to intended receivers based on reception of an acknowledgment from the receivers, a time for a next transmission is smaller than a time to make changes to the next transmission, resources to be used for a predetermined set of retransmissions of the second sidelink message, or the second UE meeting at least one predetermined criterion.

15. The apparatus of claim 14, wherein the at least one predetermined criterion is selected from at least one of: being below a minimum Reference Signal Received Power (RSRP), being below a minimum Reference Signal Received Quality (RSRQ), having a particular identity (ID), or being beyond a predetermined range from the first UE.

16. An apparatus for a first user equipment (UE), the apparatus comprising:

processing circuitry configured to configure the first UE to:

transmit a first sidelink message to a second UE;

receive, from the second UE, a second sidelink message;

in response to reception of the second sidelink message, detect a collision with the second sidelink message or with a future sidelink message from the first UE, the collision indicating simultaneous access of a channel using overlapping resources;

determine whether to provide a conflict indication to the second UE;

in response to a determination to provide the conflict indication to the second UE, report, to the second UE, the conflict indication as inter-UE coordination feedback; and at least one of:

determine whether to transmit, or reduce transmission priority of, the conflict indication dependent on whether the second sidelink message is a retransmission of an earlier sidelink transmission based on at least one of preconfiguration, whether a sidelink control information (SCI) format of the second sidelink message conveys a retransmission index, or a flag in the SCI format indicates that the conflict indication is allowed in response to the second sidelink message, detect a congestion metric of a channel to be used to transmit the conflict indication and determine whether to transmit the conflict indication dependent on whether the congestion metric exceeds a congestion threshold, and detect whether an earlier conflict indication has been previously transmitted that indicates a collision with a transport block used to transmit the second sidelink message; and a memory configured to store the inter-UE coordination feedback.

17. A non-transitory computer-readable storage medium that stores instructions for execution by one or more processors of a first user equipment (UE), the one or more processors to configure the first UE to, when the instructions are executed:

receive a first sidelink message from a second UE;

transmit, to the other second UE, a second sidelink message;

in response to transmission of the second sidelink message, receive, from the second UE, inter-UE coordination feedback containing a conflict indication that indicates a collision of the second sidelink message or with a future sidelink message from the first UE, the collision indicating simultaneous access of a channel using overlapping resources, the conflict indication being at least 1 bit, the conflict indication having a physical sidelink feedback channel (PSFCH) physical structure with a 1 physical resource block (PRB) frequency domain allocation and a 2 symbol time domain allocation, the PSFCH physical structure reused for both transmission of the conflict indication and transmission of sidelink Hybrid Automatic Repeat Request Acknowledgment (SL HARQ-ACK) feedback; and in response to reception of the conflict indication, take action to resolve the collision.

18. The non-transitory computer-readable storage medium of claim 17, wherein the conflict indication is 2 bits encoded using different frequency shifts of a sequence mapped to 12 resource elements.

* * * * *